United States Patent [19]
Yagi et al.

[11] Patent Number: 5,106,563
[45] Date of Patent: Apr. 21, 1992

[54] PROCESS FOR PRODUCING HIGHLY ORIENTED MOLDED ARTICLE OF ULTRA-HIGH-MOLECULAR-WEIGHT POLYETHYLENE

[75] Inventors: Kazuo Yagi; Seikoh Naganuma, both of Ohtake, Japan

[73] Assignee: Mitsui Petrochemical Industries, Ltd., Tokyo, Japan

[21] Appl. No.: 406,172

[22] Filed: Sep. 13, 1989

Related U.S. Application Data

[63] Continuation of Ser. No. 857,373, Apr. 30, 1986, abandoned.

[30] Foreign Application Priority Data

May 1, 1985 [JP] Japan .................................. 60-92356

[51] Int. Cl.$^5$ ............................................. D01F 6/04
[52] U.S. Cl. ................................... 264/204; 264/203; 264/210.7; 264/210.8; 264/211.13; 264/211.15; 264/205
[58] Field of Search ............ 264/203, 204, 164, 210.8, 264/211.12

[56] References Cited

U.S. PATENT DOCUMENTS

| | | | |
|---|---|---|---|
| 4,344,908 | 8/1982 | Smith et al. | 264/203 |
| 4,413,110 | 11/1983 | Kavesh et al. | 264/164 |
| 4,422,993 | 12/1983 | Smith et al. | 264/210.8 |
| 4,430,383 | 2/1984 | Smith et al. | 264/210.8 |
| 4,455,273 | 6/1984 | Harpell et al. | 264/203 |
| 4,519,679 | 5/1985 | Horikiri et al. | 350/339 R |
| 4,551,296 | 11/1985 | Kavesh et al. | 264/184 |
| 4,663,101 | 5/1987 | Kavesh et al. | 264/204 |

FOREIGN PATENT DOCUMENTS

| | | |
|---|---|---|
| 0135253 | 3/1985 | European Pat. Off. |
| 3709765 | 7/1962 | Japan |
| 1100497 | 1/1968 | United Kingdom |
| 2051667 | 1/1981 | United Kingdom |

OTHER PUBLICATIONS

European Search Report dated Nov. 19, 1987.

Primary Examiner—Hubert C. Lorin
Attorney, Agent, or Firm—Sherman and Shalloway

[57] ABSTRACT

A pre-oriented molded article of ultrahigh-molecular-weight polyethylene is composed of ultrahigh-molecular-weight polyethylene having an intrinsic viscosity of at least 5 dl/g, has a degree of orientation of at least 0.8, and has such a creep property that a stretched product of the molded article having a degree of orientation of about 0.97 shows an elongation of not more than 2% in an atmosphere at 80° C. at 1000 seconds. The pre-oriented molded article is produced by (1) extruding a high-concentration molding solution composed of 15 to 80 parts by weight of ultrahigh-molecular-weight polyethylene and 85 to 20 parts by weight of a solvent capable of dissolving said polyethylene from a molding die at a temperature at which the molding solution remains a solution, (2) taking up the extrudate at a draft ratio of at least 3, and cooling the extrudate during or after take-up to crystallize the polyethylene in the extrudate and to form a pre-oriented molded article. A stretched molded article is produced from the pre-oriented molded article by (3) stretching the pre-oriented molded article at a stretch ratio of at least 3.

10 Claims, 6 Drawing Sheets

PROCESS FOR PRODUCING HIGHLY ORIENTED MOLDED ARTICLE OF ULTRA-HIGH-MOLECULAR-WEIGHT POLYETHYLENE

This application is a continuation of application Ser. No. 06/857,737 filed Apr. 30, 1986, now abandoned.

BACKGROUND OF THE INVENTION

This invention relates to a highly oriented molded article of ultrahigh-molecular-weight polyethylene and a process for producing the molded article. More specifically, this invention relates to a process for producing a highly oriented molded article of ultrahigh-molecular-weight polyethylene by the solution molding technique which comprises the steps of preparing a high-concentration molding solution of ultrahigh-molecular-weight polyethylene, extruding the solution from nozzles, taking up the resulting extrudate while applying a draft to it, and crystallizing the ultrahigh-molecular-weight polyethylene in the extrudate; and to a highly oriented molded article so produced.

Ultrahigh-molecular-weight polyethylene has superior impact strength, abrasion resistance, chemical resistance and tensile strength to general-purpose polyethylenes, and has been gaining increasing acceptance as engineering plastics. It is difficult however to fabricate it by extrusion or injection molding because it has a much higher melt viscosity, and therefore lower flowability, than the general purpose polyethylenes. In most cases, the high-molecular-weight polyethylene is fabricated by compression molding, and articles of limited forms, such as rods, are presently produced from it by extrusion at low speeds.

Japanese Patent Publication No. 9765/1962 proposed a process for producing monofilaments of high-density polyethylene by drawing at a high ratio, which comprises incorporating a high boiling additive having a higher melting point than polyethylene in an amount of 20 to 150% in the polyethylene, preparing a high-concentration dispersion of the mixture, forming a primary fibrous material from it, and hot-drawing the fibrous material to 3 to 15 times the original length while leaving 5 to 25% of the additive in it. This patent document, however, only discloses general-purpose high-density polyethylene having an MFR of 0.7 to 5.0 g/10 min. The draw ratio used is 3.4 to 11.6, and the drawn filaments have a tensile strength of 3.5 to 13.6 g/d. The patent document gives a description on the effect of drafting during spinning, but the experimental results shown there indicate that as the draft, i.e. the spinning speed, increases, the maximum draw ratio decreases, and with it, the tensile strength of the product decreases. It is seen therefore that with polyethylene having such a degree of polymerization corresponding to an MFR of 0.7 to 5.0 g/10 min., an increase in draft does not contribute to improved tensile strength.

U. S. Pat. Nos. 4,422,993 and 4,430,383 proposed a process which comprises spinning a solution of linear polyethylene having a molecular weight of at least 400,000 which is higher than the molecular weights of general-purpose polyethylenes, and drawing the spun filaments at such a temperature that the drawn filaments have a modulus of at least 20 GPa. This process enables the production of monofilaments having higher tenacity and modulus of elasticity than drawn filaments of the general-purpose high-density polyethylene. These patents describe that the polymer concentration of the solution of high-molecular-weight polyethylene is 1 to 50% by weight. However, in the actual examples disclosed in the patents, the concentration is 8% by weight at the highest. In fact, it is extremely difficult to prepare a uniform high-concentration solution of such ultrahigh-molecular-weight polyethylene. An ordinary method involving simply heating the polymer and solvent together cannot give such a solution, and a special method must be employed (see European Laid-Open Patent Publication No. 135253).

It is considered that an undrawn product (dry gel fiber) obtained from a solution having such a relatively low polymer concentration is of a lamellar porous structure [see Kalb and Pennings, Polymer Bulletin, vol. 1, 878–80 (1979), Polymer, 2584–90 (1980), and Smook et al., Polymer Bulletin, vol. 2, 775–83 (1980).

British Patent No. 1,100,497 proposes a process which comprises dissolving a linear or branched, non-crosslinked polymer in a non-polymerizable compound in a concentration of 2 to 33% by weight, extruding the solution downwardly from a spinneret into non-heated air to cool the extrudate by the non-heated air and lower its temperature, thereby separating the polymer from the solution and forming filaments, and winding up the filaments without evaporating the solvent. Example 21 of this document discloses the spinning of a 3% naphthalene solution of polyethylene ACX (a product of Allied Chemical Corp., U.S.A. which it is said has a molecular weight between 1,000,000 and 3,000,000). As in the two U.S. Patents cited above, this patent document also fails to disclose an example of using a high-concentration solution of ultrahigh-molecular-weight polyethylene.

It has been found that according to the solution-spinning method using a low concentration solution of ultrahigh-molecular-weight polyethylene, when filaments obtained by extruding the solution from a spinneret are placed under a draft, the tensile force generated by the draft cannot be transmitted fully to the polyethylene molecules because there are few points of entanglement between molecular chains of the polymer in the solution; and that consequently, an increase in density owing to molecular orientation cannot be achieved, and the drafting itself cannot contribute to the increasing of the tenacity of the fibers.

In any case, since the solution has a low polymer concentration, even when the filaments are wound up at high speeds under the application of a draft, the yield of the final product is low, and the amount of the solvent to be recovered is too large.

European Laid-Open Patent Publication No. 64167 proposes a process which is an improvement over the process disclosed in the two U.S. Patents cited above. This process comprises dissolving polyethylene in a first non-volatile solvent, spinning the solution, extracting the first solvent from the filaments by using a second volatile solvent, drawing the filaments before or after the extraction, and thereafter, removing the second solvent by drying. The patent document states that the concentration of the polymer in the first solvent is 2 to 15% by weight, preferably 4 to 10% by weight. Hence, like the above-mentioned processes, this process also uses a spinning solution having a relatively low polymer concentration. The document further states that since the application of a draft at the time of extruding the first solvent solution seems to be very deleterious on the various properties of the final filaments, the draft ratio is preferably below 2:1 and drafting should be avoided as much as possible (page 8, lines 36–38 of European Laid-Open Patent Publication No. 64167). The patent document discloses that the structural requirements which the gel filaments (xerogel) with very little porosity obtained by such a process are that they should be unoriented undrawn filaments having a crystalline orientation function, measured by broad-angle X-ray diffractometry, of less than 0.2, preferably less than 0.1, a crystallinity index, measured by broad-angle X-ray diffraction, of less than 80%, preferably less than 75 and the size of spherulites crossing the diameters of the filaments has a partial deviation of less than 0.25.

All of the processes discussed above only show the use of spinning solutions having a relatively low polymer concentration in the solution spinning of ultra-high-molecular-weight polyethylene. The following statement of Dr. Paul Smith, an inventor of the above-cited U.S. Pat. No. 4,422,993 may be partly useful in considering a reason for this state of the art. Dr. Smith stated in an argument submitted during the examination of Japanese Laid-Open Patent Publication No. 15408/1981 corresponding to the above U.S. Patent that to obtain drawn filaments having high tenacity, gel-like filaments containing a solvent having a polymer concentration of generally less than 25% by weight, preferably less than 10% by weight, should be cooled without substantially evaporating the solvent. In other words, Dr. Smith stated that for the production of filaments of high tenacity, crystallization should be performed in such low polymer concentrations as to prevent the increase of the concentration of the spinning solution attributed to the evaporation of the solvent.

Mitsuhashi et al. (Papers for 1984 Meeting of Research Institute for Polymeric Materials for Fibers, pages 107–113) state a gel film obtained by crystallization of a solution having a concentration of 15% or less assumes a long period structure of about 100 Å as a result of observing its X-ray small-angle scattering, and that the dry gel film evidently has a porous structure based on a lamellar structure as determined by observation under an electron microscope. It was also determined by a similar method of observation that the dry gel film obtained from the solution having a concentration of at least 15% by weight has a long period structure of about 200 Å and a dense spherulitic structure. The article concludes that as the concentration of polyethylene increases, the lamellar structure changes to spherulites in which the molecular chains (tie molecules) get into spaces between the crystalline lamellae. The paper goes on to state that a dry gel film having a few number of entangled molecular chains (tie molecules) obtained by crystallization from a solution having a concentration of 15% by weight or less shows good drawability, whereas a dry gel film obtained by crystallization from a high-concentration solution has a large number of such tie molecules, and as a result of abrupt increase of the stress in the drawing step, the draw ratio to be reached is lowered and the film fractures, with the result that the properties of the product become saturated early.

As stated above, the prior established theory was that fibers of high modulus and strength cannot be obtained from high-concentration solutions.

Later, a process for producing a high-concentration solution of ultrahigh-molecular-weight polyethylene by subjecting the polyethylene and a solvent to a swelling treatment at a specific temperature was proposed (see European Laid-Open Patent Publication No. 135,253). It has been found however that even when a high-concentration solution of ultrahigh-molecular-weight polyethylene obtained by this process is simply spun by the process disclosed in U.S. Pat. No. 4,422,993 disclosed above, it is difficult to obtain drawn filaments having high strength and modulus.

U.S. Pat. No. 4,545,950 discloses a process which comprises melt-kneading ultrahigh-molecular-weight polyethylene with a paraffinic wax having a melting point, determined by the DSC method, of 40° to 120° C. at a temperature of 180° to 280° C., extruding the mixture from a spinning die under a draft at a draft ratio of not less than 2, solidifying the resulting unstretched extrudate, and stretching it at a stretch ratio of at least 3. According to this process, the extrudate from the spinning die is solidified before it is stretched. Hence, not only the polyethylene but also the paraffinic wax in it is solidified.

It is an object of this invention to provide a process for producing a stretched molded article of ultrahigh-molecular-weight polyethylene which has high modulus and strength from a concentrated solution of the polyethylene.

Another object of this invention is to provide a process for producing a stretched molded article of ultrahigh-molecular weight polyethylene which comprises the steps of extruding a concentrated solution of the polyethylene from a die and taking the extrudate while positively applying a draft to it in spite of the fact that previously, the application of a draft has been considered undesirable.

Still another object of this invention is to provide pre-oriented molded article (unstretched molded article) which has good creep properties and is suitable for giving stretched molded articles of ultrahigh-molecular-weight polyethylene having high modulus and strength; and a process for producing such stretched molded articles.

Further objects of this invention along with its advantages will become apparent from the following description.

DESCRIPTION OF THE INVENTION

Figure 1:
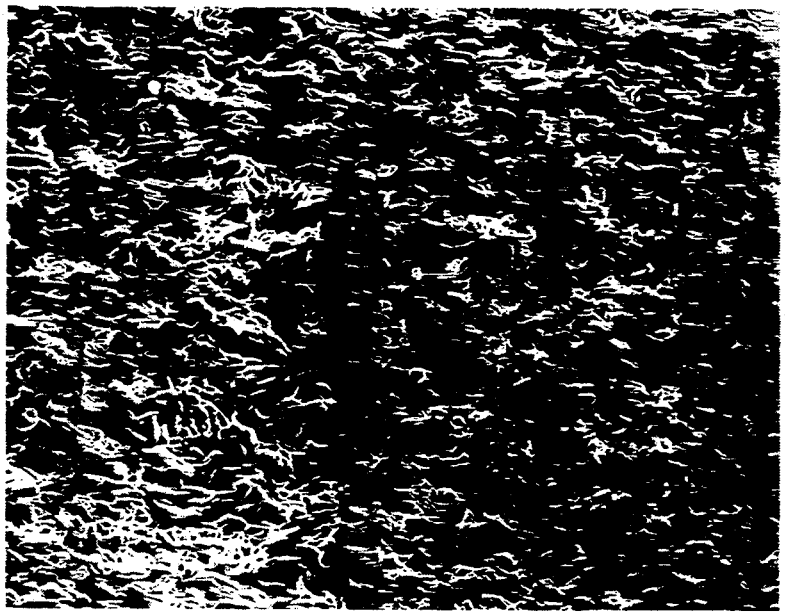
FIG. 1 shows an electron micrograph (3000×) of a polyethylene filament pre-oriented at a draft ratio of 2.2 with a resulting uneven lamellar and porous structure.

According to this invention, the above objects and advantages of this invention are basically achieved by a process for producing a stretched molded article of ultrahigh-molecular-weight polyethylene, which comprises
(1) extruding a high-concentration molding solution composed of 15 to 80 parts by weight of ultra-high-molecular-weight polyethylene having an intrinsic viscosity, measured in decalin at 135° C., of at least 5 dl/g and 85 to 20 parts by weight of a solvent capable of dissolving said polyethylene from a molding die at a temperature at which the molding solution remains a solution,
(2) taking up the extrudate at a draft ratio of at least 3, cooling the extrudate during or after take-up to crystallize the polyethylene in the extrudate and to form a pre-oriented molded article, and
(3) stretching the pre-oriented molded article at a stretch ratio of at least 3.

The ultrahigh-molecular weight polyethylene used in the process of this invention has an intrinsic viscosity [η], measured in decalin at 135° C., of at least 5 dl/g, preferably 7 to 30 dl/g. If the intrinsic viscosity is less than 5 dl/g, stretched molded articles having excellent tensile strength cannot be obtained even if high draft ratios are used during or before drawing. There is no particular upper limit to the intrinsic viscosity. However, if the intrinsic viscosity exceeds 30 dl/g, the melt viscosity of the polymer in a high concentration is very high. The polymer therefore tends to have poor melt-spinnability because of the occurrence of melt fracture, etc. during extrusion. The ultrahigh-molecular-weight polyethylene is among those polyethylenes which are obtained by the so-called Ziegler polymerization of ethylene with or without a small amount (for example, not more than 10 mole%) of another alphaolefin such as propylene, 1-butene, 4-methyl-1-pentene or 1-hexene and which have a very high molecular weight.

The solvent used in this invention which can dissolve the ultrahigh-molecular weight polyethylene preferably has a boiling point above its melting point+20° C. and a melting point below room temperature. The advantage of the solvent having a melting point below room temperature is that even when cooled to below room temperature, it does not solidify, and can be fully removed in a stretching step or a washing step to be described. Accordingly, the amount of the residual solvent can be reduced, and stretched molded articles having excellent tensile strength or creep properties can be obtained.

Specific examples of the solvent include aliphatic hydrocarbons such as n-nonane, n-decane, n-undecane, n-dodecane, n-tetradecane, n-octadecane, liquid paraffin and kerosene; aromatic hydrocarbon solvents or hydrogenated derivatives thereof, such as xylene, tetralin, butylbenzene, p-cymene, cyclohexylbenzene, diethylbenzene, pentylbenzene, dodecylbenzene, bicyclohexyl, decalin, methylnaphthalene and ethylnaphthalene; halogenated hydrocarbons such as 1,1,2,2-tetrachloroethane, pentachloroethane, hexachloroethane, 1,2,3-trichloroethane, hexachloroethane, 1,2,3-trichloropropane, dichlorobenzene, 1,2,4-trichlorobenzene and bromobenzene; and mineral oils such as paraffinic process oils, naphthenic process oils and aromatic process oils.

In the first step of the process of this invention, a high-concentration molding solution prepared from 15 to 80 parts by weight of the ultrahigh-molecular-weight polyethylene and 20 to 85 parts by weight of the solvent is extruded from a molding die at a temperature sufficient to maintain the molding solution in solution.

If the amount of the solvent is below 20 parts by weight, it is difficult to dissolve the polymer. At the same time, the molding solution attains a high melt viscosity and is extremely difficult to melt-extrude. Furthermore, the extruded unstretched article has marked surface roughening and is liable to break on stretching. On the other hand, if the amount of the solvent exceeds 85 parts by weight, the number of points of entanglements of the molecular chains is small, and a sufficient tensile force cannot be maintained in the molding line. Consequently, stretched articles having high modulus and tensile strength cannot be obtained in the subsequent stretching step at any stretch ratio. Furthermore, the solution of such a low concentration has a reduced viscosity and poor moldability, and a large amount of the solvent must be recovered after use. The operation on the whole therefore becomes complex.

The high-concentration spinning solution used in the process of this invention contains the ultrahigh-molecular-weight polyethylene in an amount of preferably 15 to 75 parts by weight, especially preferably 15 to 70 parts by weight, and correspondingly, the solvent in an amount of preferably 85 to 25 parts by weight, especially preferably 85 to 30 parts by weight.

The high-concentration spinning solution cannot be obtained by simply mixing the ultrahigh-molecular-weight polyethylene and the solvent and heating the mixture at a temperature above the melting point of the ultrahigh-molecular-weight polyethylene. Such a high-concentration and uniform solution can be obtained, as described in the above-cited European Laid-Open Patent Publication No. 135,253, by heating the ultrahigh-molecular-weight polyethylene and the solvent while mixing them, swelling the ultrahigh-molecular-weight polyethylene with the solvent at a temperature equal to the lowest swelling temperature (° C.) of the mixture of the polyethylene and the solvent or above but lower than the melting point of the polyethylene, and further heating the mixture with stirring. The concentrated uniform solution of the ultrahigh-molecular-weight polyethylene obtained by this method, as described in the above-cited European Laid-Open Patent Publication No. 135253, has the advantage that even when it is once cooled for crystallization, a uniform solution can again be formed by simply heating the mixture of the polyethylene and the solvent. Another advantage is that since the viscosity of the concentrated solution of the ultrahigh-molecular-weight polyethylene is not extremely low as compared with a solution of general-purpose polyethylene, the solution can be sufficiently transported by using an ordinary screw extruder.

Accordingly, in the first step of the process of this invention in which this concentrated solution is used, the unstretched molded article can be obtained by feeding the solution into a screw extruder or the like and extruding it from a die. The temperature at which the ultrahigh-molecular-weight polyethylene solution is extruded from the die is not particularly restricted if it is below the boiling point of the solvent and is sufficient to maintain the concentrated solution containing the polyethylene and the solvent in the state of solution. It varies depending upon the type of the solvent, but is preferably within the range of 140° C. to 250° C., more preferably from 150° C. to 220° C.. If the extrusion is carried out at a temperature at which the state of solution cannot be maintained, surface roughening and melt fracture occur in the second step under a draft, and a uniform pre-oriented molded article cannot be obtained. If the extruding temperature is above 250° C., the molecules of the ultrahigh-molecular-weight polyethylene might be degraded.

In the second step, the extrudate from the molding die in the first step is taken up at a draft ratio of at least 3.

The draft in this invention denotes the drawing, in the solution state, of the concentrated solution of the polyethylene extruded from the die. The ratio of the extruding speed $v_o$ of the concentrated solution in the die orifice and the speed v of taking up the solidified pre-oriented molded article is defined as the stretch ratio. The draft ratio varies depending upon the concentration and temperature of the concentrated solution and the molecular weight of the polyethylene, but is usually at least 3, preferably at least 6, especially preferably 6 to 200. If the draft ratio is less than 3, it is impossible to produce a sufficiently uniform highly oriented pre-oriented molded article, that is a pre-oriented molded article which can give a stretched molded article having high modulus and high tensile strength in the next drawing step. There is no particular upper limit to the draft ratio, but the upper limit is naturally set by the concentration of the solution, the operating conditions, etc.

In the second step, the extrudate is cooled during or after the take-up operation. Cooling may be effected with air or water. If in the case of cooling the extrudate with water during the take-up, the air gap, i.e. the distance between the die and the water surface, is too small, the polyethylene crystallizes without undergoing drafting. Desirably, therefore, the air gap is usually adjusted to at least 20 cm. When the cooling is carried out after the take-up, it is desirable to cool the extrudate before a long period of time elapses after the take-up. The cooling temperature is not particularly limited if it is below the temperature at which the polyethylene crystallizes. Usually, the desirable temperature is 0° to 80° C.

By performing the steps (1) and (2) of the process of this invention, there is formed a pre-oriented molded article of ultrahigh-molecular-weight polyethylene, characterized by (A) being composed of ultrahigh-molecular-weight polyethylene having an intrinsic viscosity, determined in decalin at 135° C., of at least 5 dl/g, (B) having a degree of orientation, determined by X-ray diffractometry, of at least 0.8, and (c) having such a creep property that a stretched product of the molded article having a degree of orientation of about 0.97 shows an elongation of not more than 2% in an atmosphere at 80° C. at 1000 seconds after the application of a high load which corresponds to 20% of a break load at a strain speed of 100%/min at 23° C.

The pre-oriented molded article can be produced by applying a predetermined draft to the concentrated solution of ultrahigh-molecular-weight polyethylene in step (2) of the process of this invention, and by stretching it to at least 3 times, preferably 5 to 20 times, a stretched molded article of ultrahigh-molecular-weight polyethylene having high modulus and tensile strength can be obtained.

The pre-oriented molded article of this invention has a degree of orientation, determined by X-ray diffractometry, of at least 0.85.

The degree of orientation according to X-ray diffractometry may be measured by a method using a half-value width H°, and can be defined as follows.

$$\text{Degree of orientation } (F) = \frac{90° - H°/2}{90°}$$

This method is described in detail in Yukichi Kure and Kiichiro Kubo: "Kogyo Kagaku Zasshi", vol. 39, page 929 (1939) and widely used in practice. It involves using the half-value width of an intensity distribution curve along the Debye ring of the most intense para-trobe plane on the equatorial line.

Usually, the pre-oriented molded article of this invention does not permit substantial observation of a lamellar porous structure in its electron micrograph. The presence or absence of a lamellar porous structure can be easily determined by observation under an electron microscope at a magnification of about 3000.

The pre-oriented molded article of this invention corresponds to an intermediate for the production of gel fibers or xerogels. It is believed that the pre-oriented molded article of this invention differs from the gel fibers or xerogels in at least one of the following points.

(1) X-ray small-angle scattering observation can determine that the extrudate crystallized without the application of a draft has a long period structure of at least 200 Å.

(2) It can be determined that an extrudate crystallized without application of a draft has a lamellar porous structure.

(3) The density of the ultrahigh-molecular-weight polyethylene in the pre-oriented molded article of this invention is at least 0.005 g/cm$^3$, preferably at least 0.01 g/cm$^3$, higher than the density of the extrudate crystallized without application of a draft.

(4) The scattering intensity of the long period of the pre-oriented filaments of this invention which can be determined by X-ray small-angle scattering observation is much lower than that of the extrudate crystallized without applying a draft.

Unlike the xerogels, the pre-oriented molded article of this invention is highly oriented. Furthermore, unlike the gel fibers, the pre-oriented molded article of this invention does not permit observation of a lamellar porous structure under an electron microscope.

As can be seen from the manufacturing process described above, the pre-oriented molded article of this invention does not substantially contain a paraffinic wax having a melting point, determined by the DSC method, of 40° to 120° C. Because of this, the pre-oriented molded article of this invention shows the excellent crimp properties shown above.

According to the process for producing the stretched molded article of this invention, the pre-oriented molded article is then stretched at a stretch ratio of at least 3 in the third step. If the stretch ratio is less than 3, the degree of crystallization by orientation of the ultrahigh-molecular-weight polyethylene is low, and a stretched molded article of high modulus and tensile strength cannot be obtained. Furthermore, since stretching unevenness occurs in the stretched molded article, its appearance is frequently degraded.

The stretching temperature is usually from 60° C. to less than (the melting point of the pre-oriented molded article +30° C.), preferably from 90° C. to (the melting point of the pre-oriented molded article S+20° C.). If it is lower than 60° C., stretching at a high ratio sometimes cannot be achieved. If it exceeds the melting point of the pre-oriented molded article plus 30° C., the pre-oriented molded article is softened, and although it can be stretched, a stretched molded article of high modulus and tensile strength is unlikely to be formed although the pre-oriented molded article can be stretched.

Whether the heat medium during stretching is air, steam or a solvent, stretched molded articles having high modulus and tensile strength can be obtained.

Stretching may be once or a plurality of times.

The final stretching speed is not particularly limited, but in view of productivity, it is preferably at least 3 m/min., particularly at least 10 m/min.

The stretched molded articles of the ultrahigh-molecular-weight polyethylene which are produced by the process of this invention show nearly equal modulus and tensile strength to stretched filaments spun from a conventional dilute solution of ultrahigh-molecular-weight polyethylene, and a higher degree of orientation which is at least 0.94, preferably 0.95. Consequently, the stretched molded articles of this invention have better weatherability and heat aging resistance.

The use of the pre-oriented molded articles of this invention gives a stretched molded article, in various forms such as a filament, a tape or a film, having high tensile modulus and strength and excellent creep properties. The resulting stretched molded article has a tensile modulus of preferably 20 GPa, more preferably 30 GPa, and a tensile strength of preferably at least 1.0 GPa, and more preferably at least 1.5 GPa.

The stretched molded articles of this invention, by utilizing their high modulus, high tensile strength and good weatherability and the inherent properties of the polyethylene, are suitably used in the form of multifilaments, monofilaments, tapes, etc. in fishing nets and ropes such as floating nets, aquaculture ropes, mooring nets and anchor nets, ropes for ships such as hosers, tag ropes, job marking ropes, and ropes for yachts; ropes for use on land such as ropes for agricultural jobs, job marking ropes, packaging nets for trucks, ropes for water skies and ropes for tent edges, cords for electric appliances, brakes for automobiles and autocycles, air conditioning, and cords for opening and closing trunks, fishing lines, parachutes, ropes for fixing rigs for submarine oil excavation and pendant ropes thereof, and interior cords such as curtains and blinds; and in the form of woven fabrics woven from such filaments, in the fields where conventional drawn filaments are used, and as reinforcing fibrous materials for composites requiring light weight, for example sporting goods such as rackets, gold clubs, sticks for gate ball, skiing stocks and bows; leisure goods such as fishing rods, yacht hulls, surfing boards and boats, and building materials; and messenger ropes and tension members.

The ultrahigh-molecular-weight polyethylene used in this invention may contain additives usually incorporated in polyolefins such as heat stabilizers, weatherability stabilizers, pigments, dyes, inorganic fillers, etc. in amounts which do not detract from the objects of this invention.

According to the process of this invention described hereinabove, stretched molded articles of high modulus and tensile strength, which by the conventional method of spinning ultrahigh-molecular-weight polyethylene, can only be obtained from a solution having a very low polymer concentration. Accordingly, the process of this invention has the advantage that unlike the method using a low-concentration solution, the recovery of a large amount of solvent is not necessary at the time of molding, and the molding speed can be made high. The conventional low-concentration gel fibers may stick to each other on a feed guide or bobbin when a plurality of such fibers are taken up. This defect is eliminated in the filaments of this invention since they are highly oriented. Furthermore, in the process of this invention, the extrudate from the molding die is taken up while applying a draft to give a molded article having the excellent properties as described above. This is surprising in view of the previous thought that the application of a draft would be very detrimental to the various properties of the final molded products.

Since the process of this invention starts from a high-concentration solution, it is easy to remove the solvent, and the shape retention of the molded article after the stretching operation is excellent. Hence, the process of this invention is suitable for the production of stretched molded articles having a large sectional area, for example a large-diameter filament or tape or a film.

The following Examples illustrate the present invention specifically. It should be understood that the invention is in no way limited to these examples.

EXAMPLE 1

Preparation of a high-concentration solution:

Twenty grams of a powder of ultrahigh-molecular-weight polyethylene having an intrinsic viscosity of 17 dl/g and 92 ml of decalin were put into a separable flask equipped with a condenser. With stirring, the mixture was heated to 110° C. and maintained at this temperature to swell the polyethylene powder. The state of the mixture was continuously observed. When about 6 minutes passed at 110° C., the mixture changed to a porridge-like viscous suspension, and the swelling ended. The suspension was then heated to 180° C., and stirred continuously. In about 5 minutes, it became a clear solution of the ultrahigh-molecular-weight polyethylene. The solution was left to stand at 180° C. for one day to degass it to form a spinning solution.

The concentration (S%) of the ultrahigh-molecular-weight polyethylene was determined as follows: A portion of the polyethylene solution was taken out and allowed to cool, and then its weight ($W_T$, g) was measured. Decalin was then removed from the solution by decantation, and the residue was dried. The weight ($W_P$, g) of the dry solid product was measured. $S(\%)$ is calculated in accordance with the following formula.

$$S(\%) = \frac{W_P}{W_T} \times 100$$

The concentration of the ultrahigh-molecular-weight polyethylene in the solution so determined was 20% by weight.

Spinning:

In each run, the ultrahigh-molecular-weight polyethylene solution prepared by the above method was extruded from a plunger-type extruder fitted with a die having a diameter of 2 mm at a temperature of 180° C. at a rate of 0.785 cc/min. The extruded polyethylene strand was taken up at room temperature with an air gap of about 50 cm, and then introduced into a water tank to crystallize it completely. The draft ratio at this time was adjusted as shown in Table 1 by varying the take-up speed. The pre-oriented filament taken up was immersed in 1000 cc, per gram of the pre-oriented filament, of hexane and left to stand at room temperature for one day to remove decalin. The pre-oriented filament stripped of decalin was then dried overnight at room temperature under reduced pressure. The density and the degree of orientation by X-ray diffraction of the dried pre-oriented filament were measured, and the filament was also observed under an electron microscope. The results are shown in Table 1.

TABLE 1

| Run No. | Draft ratio | Density (g/cm³) | Degree of orientation | Presence of pores by the lamellar structure |
|---|---|---|---|---|
| 1 | — | 0.952 | 0.56 | Yes |
| 2 | 2.2 | 0.955 | 0.65 | Yes |
| 3 | 5.0 | 0.958 | 0.75 | Yes |
| 4 | 6.8 | 0.960 | 0.87 | No |
| 5 | 14 | 0.965 | 0.89 | No |
| 6 | 25 | 0.967 | 0.92 | No |
| 7 | 50 | 0.969 | 0.93 | No |
| 8 | 68 | 0.969 | 0.93 | No |

Figure 2:
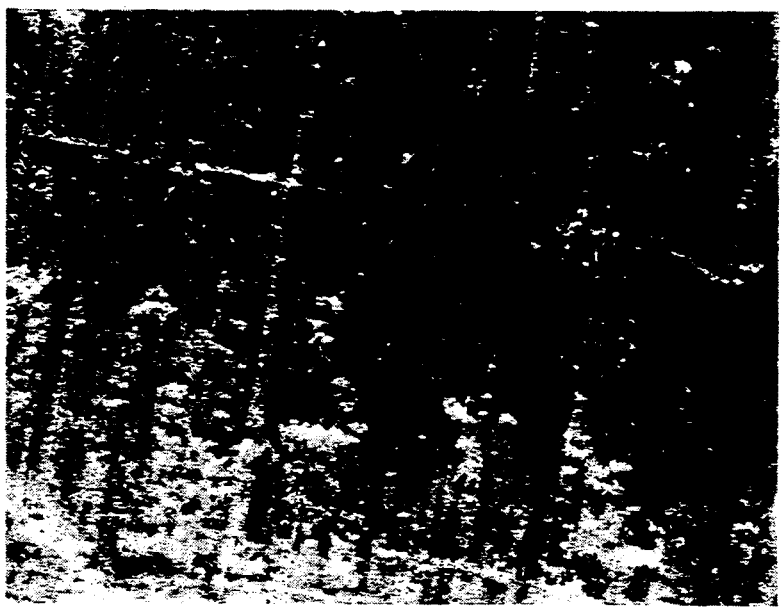
FIG. 2 shows an electron micrograph (3000×) of a polyethylene filament pre-oriented at a draft ratio of 14 with a resulting dense structure.

The results given in Table 1 show that the filaments obtained in Runs Nos. 3 to 8 have a very high degree of orientation owing to the effect of the draft, and the drafting operation alone gave the filaments having degrees of orientation comparable to those of conventional stretched polyethylene filaments; and that the densities of these filaments exceed those of the conventional stretched polyethylene filaments Electron micrographs (3000×) of the filaments obtained in Runs Nos. 2 and 5 are shown in FIGS. 1 and 2, respectively. In FIG. 1, unevenness based on the lamellar structure was clearly observed in FIG. 1, and it shows a porous structure. The porous structure, however, was not observed in FIG. 2, and the filament shows a dense structure.

Figure 3:
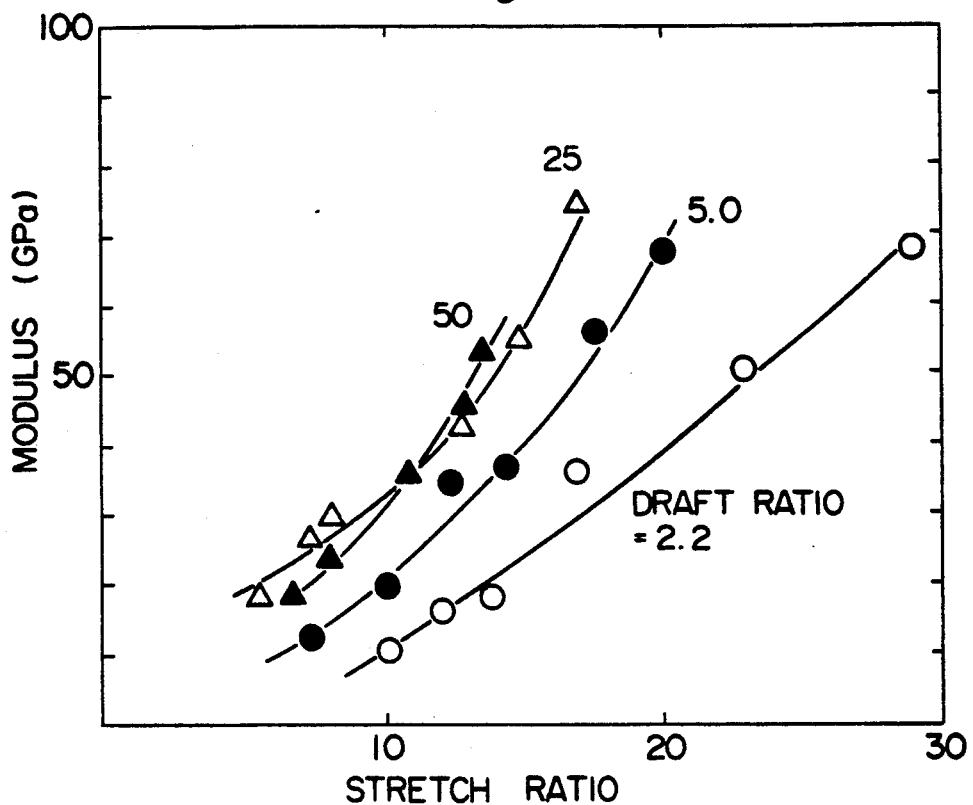
FIG. 3 shows the relation between stretch ratios applied to a pre-oriented filament and the resulting moduli for various draft ratios.

Stretching:

The pre-oriented filament obtained as above was drawn by three godet rollers in two stages in a stretching tank containing n-decane as a heat medium. A first stretching tank was kept at 110° C., and a second stretching tank, at 130° C. The available length of each of the tanks was 50 cm. The filament was stretched at different stretch ratios as shown in Table 2 by setting the rotating speed of a first godet roll at 0.5 m/min., and changing the rotating speed of a third godet roll. The rotating speed of a second godet roll was properly selected within a range which permitted stable stretching. The stretch ratio was calculated from the rotating ratio of the first godet roll and the third godet roll. The condition (draft ratio) for preparation of the pre-oriented filament, and the tensile modulus and tensile strength of the stretched filament are shown in Table 2. The relation between stretch ratios and moduli are shown in FIG. 3, and the relation between stretch ratios and tensile strengths, in FIG. 4.

The modulus and tensile strength were measured at room temperature (23° C.) by an Instron universal tester (Model 1123, made by Instron Company) At this time, the length of the sample between clamps was adjusted to 250 mm, and the pulling speed, to 250 mm/min. The modulus was an initial modulus calculated by using the inclination of the tangent of the initial slope. The cross-sectional area of the filament necessary for calculation was calculated from the filament weight and its density which was measured by the density gradient method.

TABLE 2

| Run No. | Draft ratio | Stretch ratio | Tensile modulus (GPa) | Tensile strength (GPa) |
|---|---|---|---|---|
| 9 | 2.2 | 10.2 | 11.0 | 1.01 |
| 10 | 2.2 | 12.0 | 16.2 | 1.30 |
| 11 | 2.2 | 13.8 | 18.6 | 1.32 |
| 12 | 2.2 | 17.0 | 36.4 | 1.48 |
| 13 | 2.2 | 23.0 | 50.9 | 1.70 |
| 14 | 2.2 | 29.0 | 68.0 | 1.75 |
| 15 | 5.0 | 7.4 | 12.2 | 1.15 |
| 16 | 5.0 | 10.1 | 19.3 | 1.51 |
| 17 | 5.0 | 12.4 | 34.5 | 1.56 |
| 18 | 5.0 | 14.3 | 36.2 | 1.78 |
| 19 | 5.0 | 17.7 | 56.0 | 2.17 |
| 20 | 5.0 | 20.0 | 67.5 | 2.23 |
| 21 | 25 | 5.6 | 18.2 | 1.44 |
| 22 | 25 | 7.3 | 26.5 | 1.78 |
| 23 | 25 | 8.2 | 29.6 | 1.80 |
| 24 | 25 | 12.8 | 42.9 | 2.23 |
| 25 | 25 | 14.9 | 55.2 | 2.61 |
| 26 | 25 | 17.2 | 74.3 | 3.05 |
| 27 | 50 | 6.8 | 18.6 | 1.61 |
| 28 | 50 | 8.1 | 23.9 | 1.96 |
| 29 | 50 | 11.0 | 35.8 | 2.41 |
| 30 | 50 | 12.9 | 45.7 | 2.77 |
| 31 | 50 | 13.5 | 53.3 | 3.06 |

Figure 4:
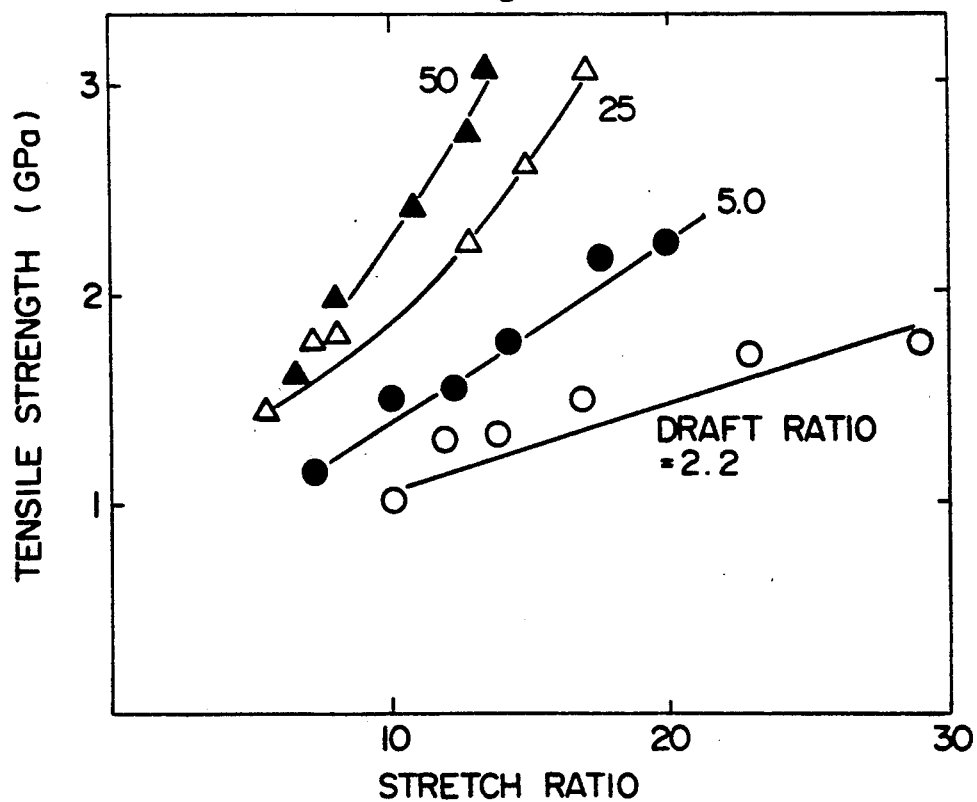
FIG. 4 shows the relation between stretch ratios applied to a pre-oriented filament and the resulting tensile strengths for various draft ratios.

It is seen from Table 2 and FIGS. 3 and 4 that when the draft ratio is less than 3 (Run Nos. 9 to 14), stretched filaments having a high modulus can be obtained with an increase in stretch ratio, but the tensile strength becomes saturated with an increase in stretch ratio so that stretched filaments of high tensile strength cannot be obtained. This confirms the conventional knowledge that a stretched filament having a high tensile strength cannot be obtained from a spinning solution having a high polymer concentration. However, as the draft ratio is increased to 50, 25 and 5.0 (Runs Nos. 15 to 31), the modulus increases with an increase in stretch ratio, and also the tensile strength becomes particularly high with an increase in stretch ratio. Thus, according to the process of this invention, stretched filaments of high modulus and tensile strength can be obtained even by using spinning solutions having a high polymer concentration. It can be said from this that the process of this invention has much high productivity than conventional processes.

EXAMPLE 2

Figure 5:
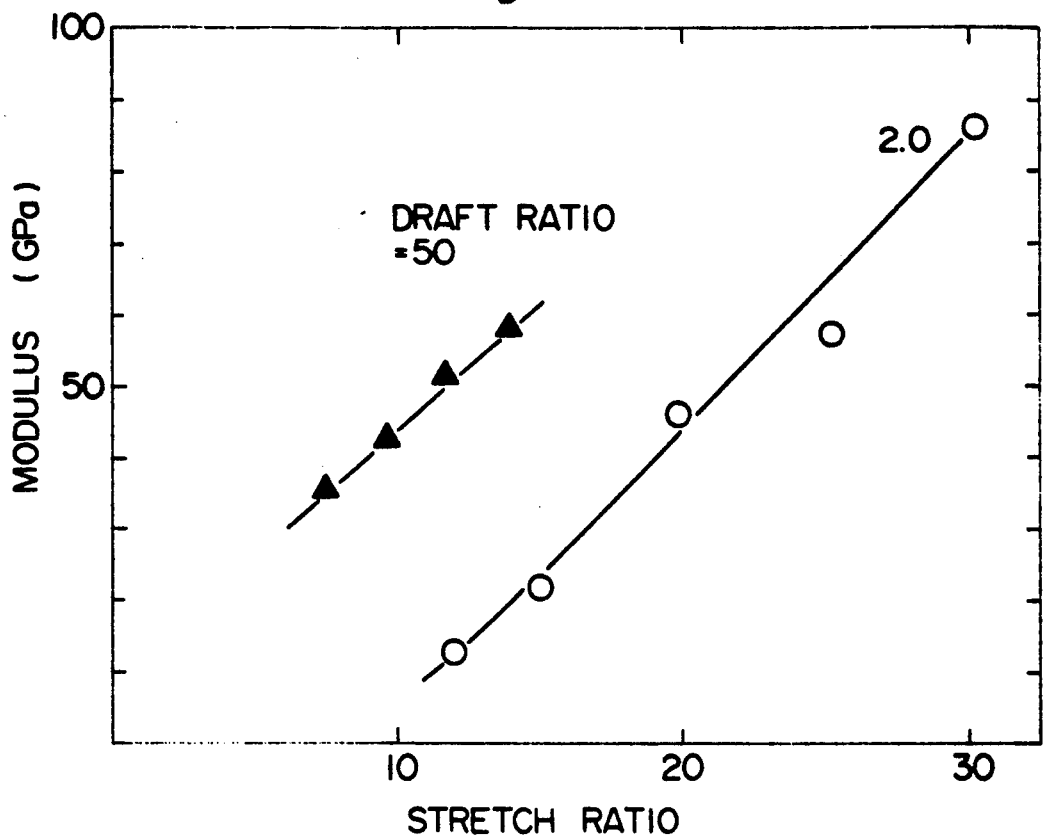
FIG. 5 shows the relation between stretch ratios applied to a pre-oriented filament and the resulting moduli for draft ratios of 2.0 and 50.
Figure 6:
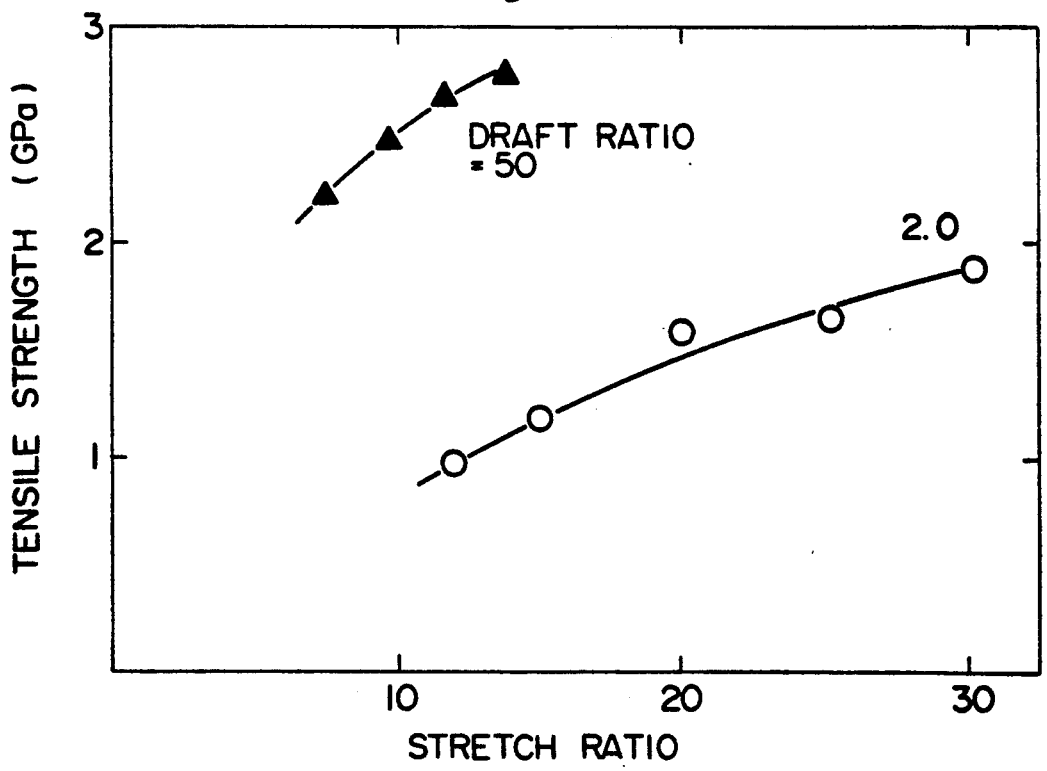
FIG. 6 shows the relation between stretch ratios applied to a pre-oriented filament and the resulting tensile strengths for draft ratios of 2.0 and 50.

A spinning solution of ultrahigh-molecular-weight polyethylene (intrinsic viscosity=8.20 dl/g) having a final concentration of 30% by weight was prepared by the method described in Example 1. By spinning the spinning solution and stretching the resulting filaments in the same way as in Example 1, stretched oriented filaments were obtained. The draft ratios, and the moduli and tensile strengths at various stretch ratios are shown in Table 4, and the relation between the stretch ratio and the modulus is shown in FIG. 5, and the relation between the stretch ratio and the tensile strength, in FIG. 6. As in Example 1, Runs Nos. 15 to 11, the strength of the filament was markedly improved by the effect of the drafting.

TABLE 3

| Run No. | Draft ratio | Stretch ratio | Tensile modulus (GPa) | Tensile strength (GPa) |
| --- | --- | --- | --- | --- |
| 32 | 2.0 | 12.0 | 12.9 | 0.96 |
| 33 | 2.0 | 15.0 | 21.6 | 1.19 |
| 34 | 2.0 | 20.0 | 45.9 | 1.59 |
| 35 | 2.0 | 25.2 | 57.2 | 1.63 |
| 36 | 2.0 | 30.2 | 85.7 | 1.87 |
| 37 | 50 | 7.4 | 35.6 | 2.21 |
| 38 | 50 | 9.7 | 42.4 | 2.48 |
| 39 | 50 | 11.7 | 51.3 | 2.69 |
| 40 | 50 | 13.8 | 58.0 | 2.78 |

COMPARATIVE EXAMPLE 1

Figure 7:
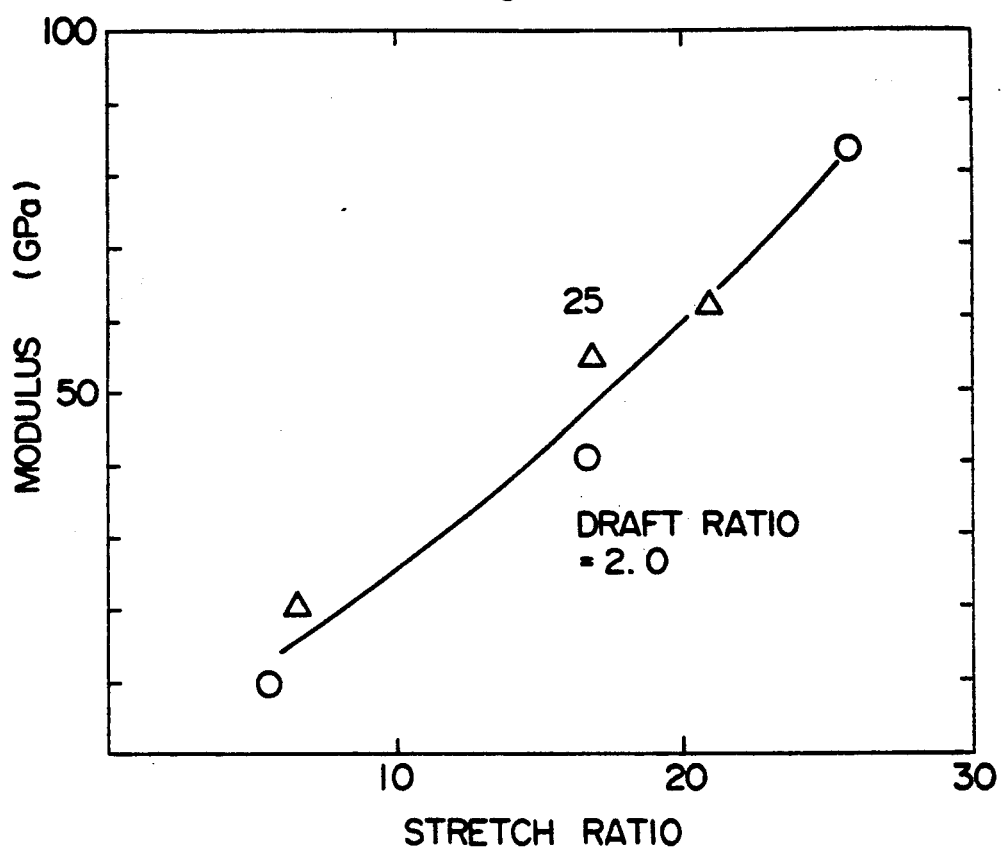
FIG. 7 shows the relation between stretch ratios applied to a pre-oriented filament and the resulting moduli for a draft ratio of 2.0 for a spinning solution of a polyethylene polymer concentration of 4% by weight and an intrinsic viscosity of 17.0 dl/g.
Figure 8:
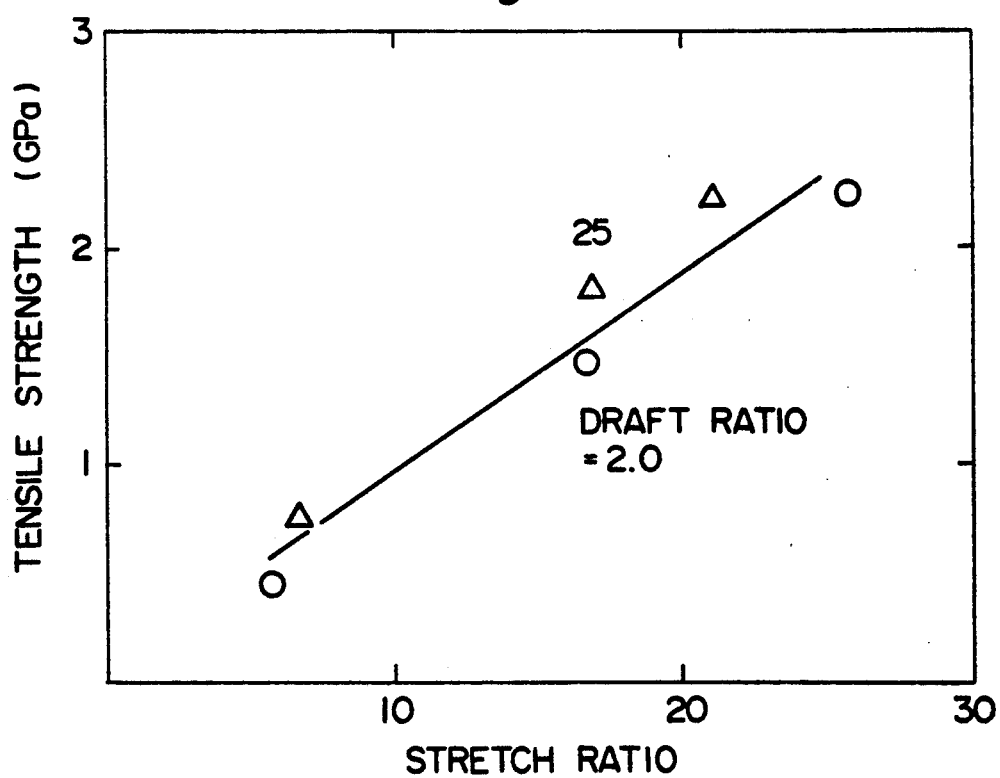
FIG. 8 shows the relation between stretch ratios applied to a pre-oriented filament and the resulting tensile strength for a draft ratio of 2.0 for a spinning solution of a polyethylene polymer concentration of 4% by weight and an intrinsic viscosity of 17.0 dl/g.

In each run, a spinning solution of ultrahigh-molecular-weight polyethylene (intrinsic viscosity: 17.0 dl/g) having a final polymer concentration of 4% by weight was prepared in the same way as described in Example 1. The spinning solution was spun by the method of Example 2, and then stretched by the method of Example 1 to give an oriented filament. Presumably because of the low polymer concentration, the pre-oriented filament under a draft had a poor ability to retain its shape. It shrank in the water tank, and the filament diameter periodically varied and did not become uniform. The draft ratios and the moduli and tensile strength at various stretch ratios are shown in Table 4; the relation between the stretch ratios and the moduli, in FIG. 7; and the relation between the stretch ratios and the tensile strengths, in FIG. 8.

TABLE 4

| Run No. | Draft ratio | Stretch ratio | Tensile modulus (GPa) | Tensile strength (GPa) |
| --- | --- | --- | --- | --- |
| 41 | 2.0 | 5.7 | 9.4 | 0.45 |
| 42 | 2.0 | 16.8 | 41.2 | 1.47 |
| 43 | 2.0 | 25.8 | 82.8 | 2.24 |
| 44 | 25 | 6.6 | 20.0 | 0.75 |
| 45 | 25 | 17.0 | 54.4 | 1.80 |
| 46 | 25 | 21.0 | 62.0 | 2.22 |

COMPARATIVE EXAMPLE 2

Figure 9:
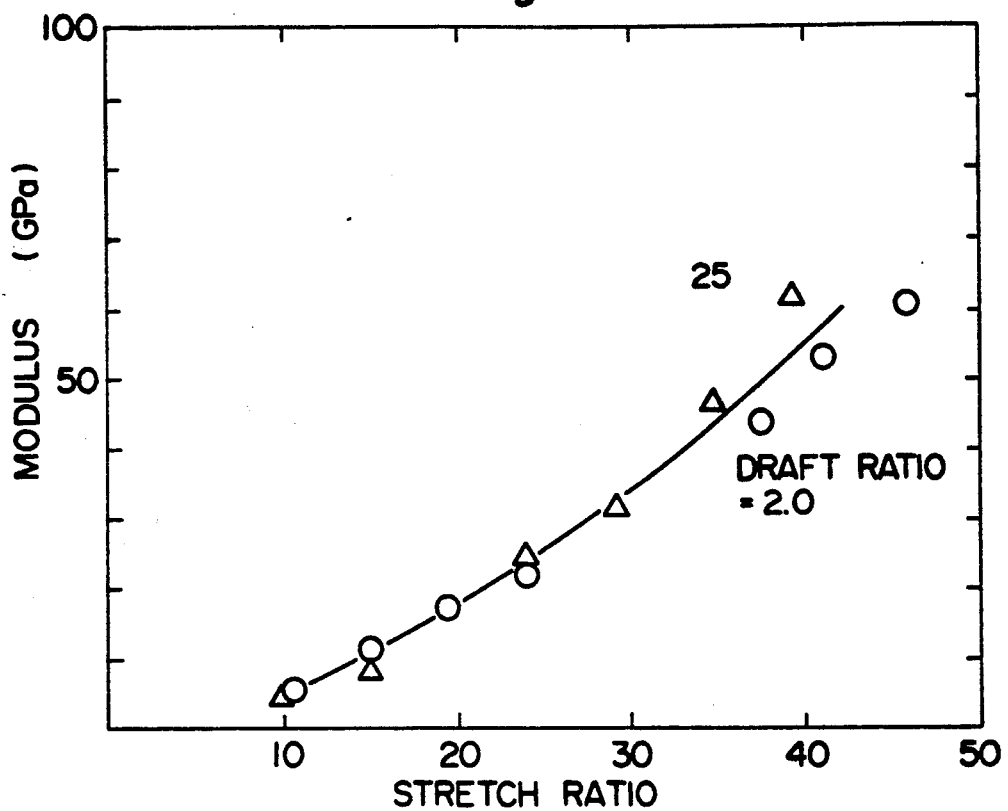
FIG. 9 shows the relation between stretch ratios applied to a pre-oriented filament and the resulting moduli for a draft ratio of 2.0 for a spinning solution of a polyethylene polymer concentration of 30% by weight and an intrinsic viscosity of 2.5 dl/g.
Figure 10:
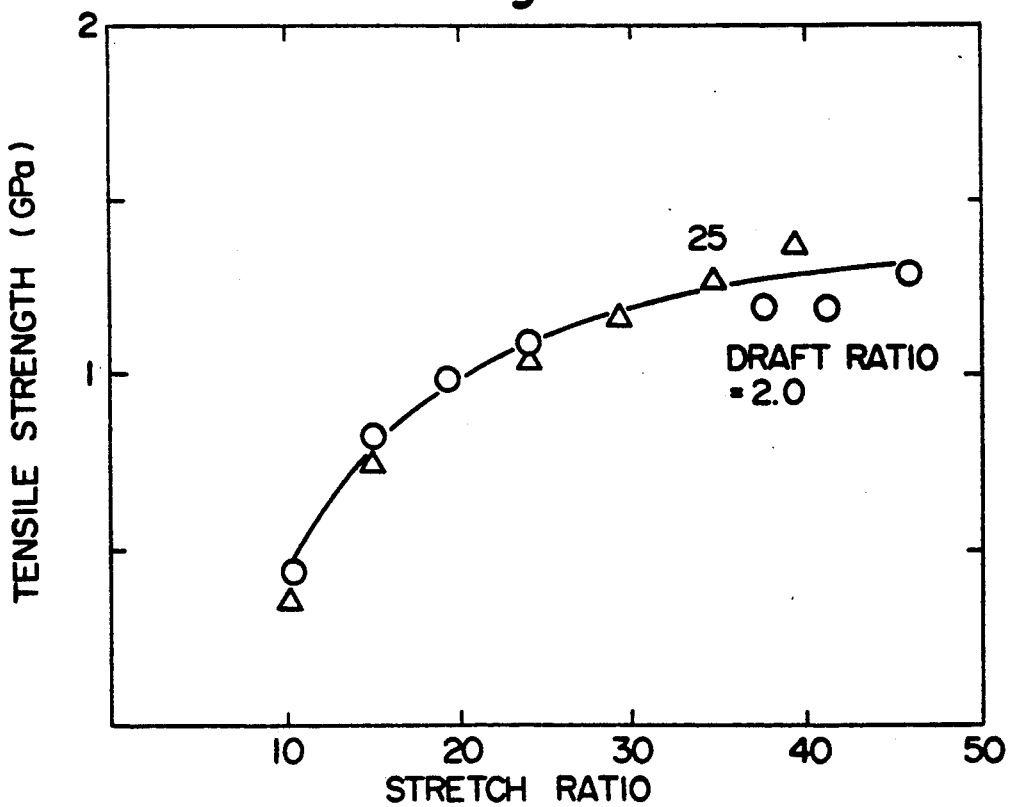
FIG. 10 shows the relation between stretch ratios applied to a pre-oriented filament and the resulting tensile strength for a draft ratio of 2.0 for a spinning solution of a polyethylene polymer concentration of 30% by weight and an intrinsic viscosity of 2.5 dl/g.

In each run, a spinning solution of polyethylene (intrinsic viscosity: 2.5 dl/g) having a final polymer concentration of 30% by weight was prepared in the same way as described in Example 1. The spinning solution was spun and then stretched by the method of Example 1 to give an oriented filament. The draft ratios and the moduli and tensile strength at various stretch ratios are shown in Table 5; the relation between the stretch ratios and the moduli, in FIG. 9; and the relation between the stretch ratios and the tensile strengths, in FIG. 10.

It is seen that with such polyethylene having such a low intrinsic viscosity, there was noted no effect of the drafting to improve modulis and tensile strengths.

TABLE 5

| Run No. | Draft ratio | Stretch ratio | Tensile modulus (GPa) | Tensile strength (GPa) |
| --- | --- | --- | --- | --- |
| 47 | 2.0 | 10.6 | 4.7 | 0.43 |
| 48 | 2.0 | 15.1 | 10.9 | 0.82 |
| 49 | 2.0 | 19.5 | 17.0 | 0.98 |
| 50 | 2.0 | 24.0 | 21.7 | 1.08 |
| 51 | 2.0 | 37.6 | 43.4 | 1.18 |
| 52 | 2.0 | 41.2 | 52.8 | 1.18 |
| 53 | 2.0 | 45.9 | 60.6 | 1.28 |
| 54 | 25 | 10.3 | 4.6 | 0.34 |
| 55 | 25 | 15.0 | 7.6 | 0.73 |
| 56 | 25 | 24.0 | 23.9 | 1.02 |
| 57 | 25 | 29.4 | 31.6 | 1.15 |
| 58 | 25 | 34.8 | 46.0 | 1.26 |
| 59 | 25 | 39.4 | 61.6 | 1.36 |

EXAMPLE 3

A spinning solution of ultrahigh-molecular-weight polyethylene (intrinsic viscosity=7.42 dl/g) was prepared by the same method as in Example 1. The polymer concentration of the solution was 54.5% by weight.

The spinning solution was spun by a spinning machine equipped with an extruder with a screw diameter of 25 mm having a spinning nozzle with a diameter of 2 mm. The spinning temperature was 180° C., and the draft ratio was 58.1.

The resulting pre-oriented filament was drawn by four godet rolls in two stages in stretching tanks containing n-decane as a heat medium, and subsequent in one stage in a stretching tank containing triethylene glycol as a heat medium (in three stages in total). A first stretching tank was kept at 120° C.; a second stretching tank, at 130° C.; and a third stretching tank, at 137° C. The available length of each of the tanks was 50 cm. In the stretching operation, the rotating speed of a first godet roll was set at 0.5 m/min., and by changing the rotating speed of a fourth godet roll, filaments having different stretch ratios were obtained. The rotating speeds of a second and a third godet roll were properly chosen within a range which permitted stable stretching. The stretch ratio was calculated from the rotation ratio of the first godet roll and the four godet roll. Table 6 shows the tensile moduli and tensile strengths at varying stretch ratios.

TABLE 6

| Run No. | Stretch ratio | Tensile modulus (GPa) | Tensile strength (GPa) |
| --- | --- | --- | --- |
| 60 | 17.5 | 53.0 | 2.16 |
| 61 | 18.5 | 63.0 | 2.23 |
| 62 | 21.0 | 68.0 | 2.31 |

EXAMPLE 4

Figure 11:
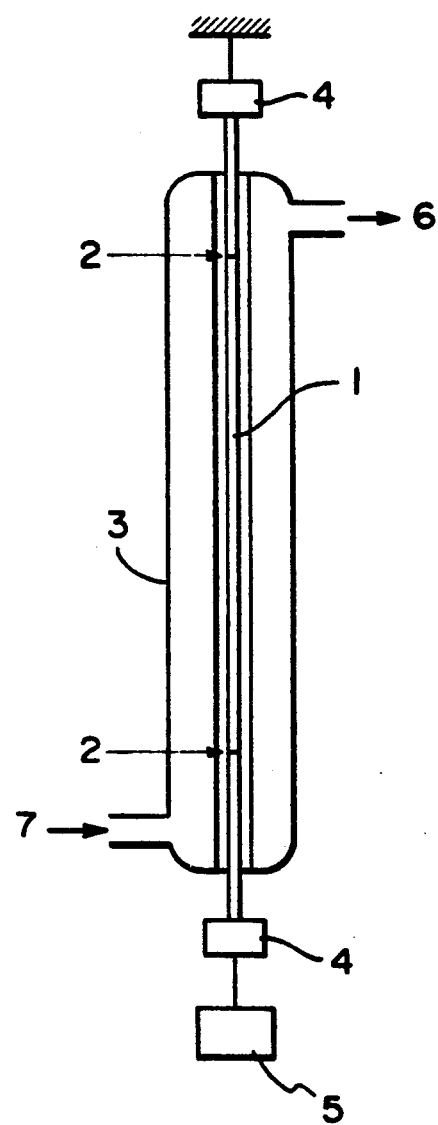
FIG. 11 shows a device for measuring the creep properties of the filaments.

The creep properties of the filaments obtained in Run No. 37 (tensile modulus 35.6 GPa, tensile strength 2.21 GPa, the degree of orientation 0.97) and Run No. 38 (tensile modulus 42.4 GPa, tensile strength 2.48 GPa, the degree of orientation 0.98) selected as samples having typical examples were examined by a device illustrated in simplified form in FIG. 11. The two ends of a sample 1 were fixed by parallel clamping grips 4 (weight 5 g). The upper end of the sample 1 was fixed via the grip 4, and its lower end was connected to a load 5 via the grip. The sample was inserted into a glass double tube 3. The ambient temperature of the sample was adjusted to 80° C. by a silicone oil circulating through the inlet 7 and outlet 6 of the glass double tube 3. The elongation of the sample was determined by observing the positions of two upper and lower indicator lines 2 (apart from each other by a distance of about 10 cm) attached to the sample with a cathet ometer through glass, and removing the effect of the grip from the relative position.

The results of measurement of the elongation of the sample under a load corresponding to 22.6% of its break stress at 23° C. (for the sample of Run No. 37) and under a load corresponding to 20.2% of its break stress at 23° C. (for the sample of Run No. 38) are shown in Tables 7 and 8, respectively. This load corresponded to a load per unit cross-sectional area of the sample of 500 MPa. The measurement results agreed nearly with the results of the measurement made on a 10 mm sample using a heat stress strain measuring device (Model SS-10, made by Seiko Electronics Industry Co., Ltd.).

TABLE 7

| (Run No. 37) | |
|---|---|
| Time (seconds) | Elongation (%) |
| 30 | 0.88 |
| 60 | 1.32 |
| 120 | 1.56 |
| 300 | 1.66 |
| 660 | 1.76 |
| 1200 | 1.78 |

TABLE 8

| (Run No. 38) | |
|---|---|
| Time (seconds) | Elongation (%) |
| 40 | 0.84 |
| 120 | 1.00 |
| 480 | 1.24 |
| 1020 | 1.56 |

What is claimed is:

1. A process for producing a stretched molded article of ultrahigh-molecular weight polyethylene, which comprises
    (1) extruding a high-concentration molding solution composed of 15 to 80 parts by weight of ultrahigh-molecular weight polyethylene having an intrinsic viscosity, measured in decalin at 130° C., of at least 5 dl/g and 85 to 20 parts by weight of a solvent capable of dissolving said polyethylene from a molding die at a temperature at which the molding solution remains a solution,
    (2) passing the extrudate through air for a distance of at least 20 cm from said molding die,
    (3) taking up the extrudate at a draft ratio of 14 to 200, cooling the extrudate with water during or after take-up to crystallize the polyethylene in the extrudate and to form a pre-oriented molded article, and
    (4) stretching the pre-oriented molded article at a stretch ratio of at least 3.

2. The process of claim 1 wherein the ultrahigh-molecular-weight polyethylene has an intrinsic viscosity of from 7 to 30 dl/g.

3. The process of claim 1 wherein the concentrated molding solution comprises 15 to 75 parts by weight of the ultrahigh-molecular weight polyethylene and 85 to 25 parts by weight of the solvent.

4. The process of claim 1 wherein the solvent has a boiling point higher than the melting point of the polyethylene, and a melting point lower than 40° C.

5. The process of claim 1 wherein the temperature at which the molding solution remains a solution is 140 to 250° C.

6. The process of claim 1 wherein crystallization is carried out during take-up.

7. The process of claim 1 wherein the stretch ratio is 5 to 20.

8. A process for producing pre-oriented molded article of ultrahigh-molecular weight polyethylene, which comprises
    (1) extruding a high-concentration molding solution composed of 15 to 80 parts by weight of ultrahigh-molecular weight polyethylene having an intrinsic viscosity, measured in decalin at 130° C., of at least 5 dl/g and 85 to 20 parts by weight of a solvent capable of dissolving said polyethylene from a molding die at a temperature at which the molding solution remains a solution,
    (2) passing the extrudate through air for a distance of at least 20 cm from said molding die, and
    (3) taking up the extrudate at a draft ratio of 14 to 200, and cooling the extrudate with water during or after take-up crystallize the polyethylene in the extrudate and to form a pre-oriented molded article.

9. The process of claim 1 wherein the concentrated molding solution comprises 30 to 75 parts by weight of the ultrahigh-molecular-weight polyethylene and 70 to 25 parts by weight of the solvent.

10. The process of claim 8 wherein the concentrated molding solution comprises 30 to 75 parts by weight of the ultrahigh-molecular-weight polyethylene and 70 to 25 parts by weight of the solvent.

* * * * *